(12) United States Patent
Lasher (10) Patent No.: US 10,023,753 B1
(45) Date of Patent: Jul. 17, 2018

(54) PRODUCT FOR RECONDITIONING A SURFACE AND METHODS FOR RECONDITIONING A SURFACE

(71) Applicant: Jamie Lasher, Adel, IA (US)

(72) Inventor: Jamie Lasher, Adel, IA (US)

(*) Notice: Subject to any disclaimer, the term of this patent is extended or adjusted under 35 U.S.C. 154(b) by 50 days.

(21) Appl. No.: 15/004,747

(22) Filed: Jan. 22, 2016

Related U.S. Application Data (63) Continuation of application No. 14/844,978, filed on Sep. 3, 2015, now abandoned.

(51) Int. Cl.
*C11D 3/382* (2006.01)
*C09D 9/00* (2006.01)
*B05D 5/00* (2006.01)

(52) U.S. Cl.
CPC ............. *C09D 9/005* (2013.01); *B05D 5/005* (2013.01)

(58) Field of Classification Search
CPC .................................. C11D 3/43; C09D 9/00
USPC .......................................................... 510/417
See application file for complete search history.

(56) References Cited

U.S. PATENT DOCUMENTS

| 7,341,986 B1 * | 3/2008 | Kalusha | ................. C11D 7/261 510/119 |
| 2002/0147122 A1 * | 10/2002 | Shick | ....................... C11D 3/18 510/295 |

* cited by examiner

*Primary Examiner* — Gregory Webb
(74) *Attorney, Agent, or Firm* — David M. Breiner; BrownWinick Law Firm (57) ABSTRACT

Disclosed is a product comprised of a urethane reducer and an oil.

9 Claims, 6 Drawing Sheets

PRODUCT FOR RECONDITIONING A SURFACE AND METHODS FOR RECONDITIONING A SURFACE

BACKGROUND

1. Field

Example embodiments relate to a product usable for reconditioning a surface. Example embodiments also relate to methods for reconditioning a surface using the product. Example embodiments also relate to a kit which includes the product.

2. Description of the Related Art

Figure 1:
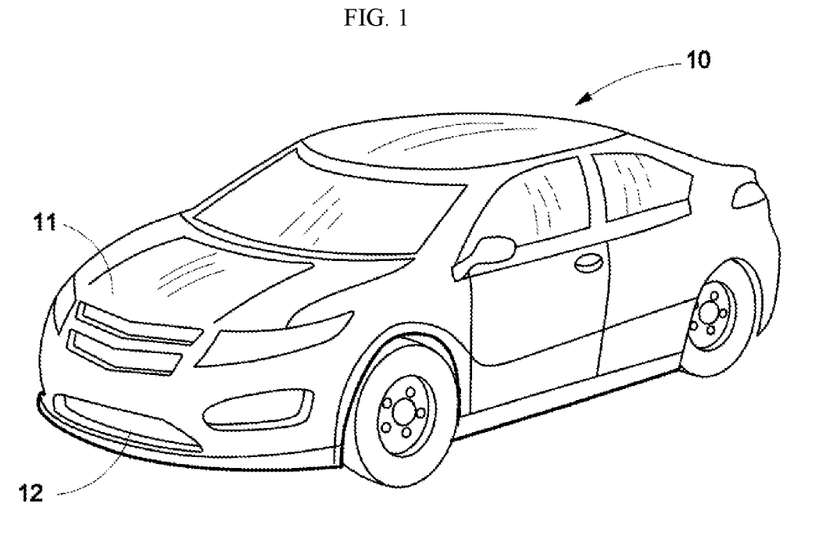
FIG. 1 is a view of a car in accordance with the prior art.
Figure 2:
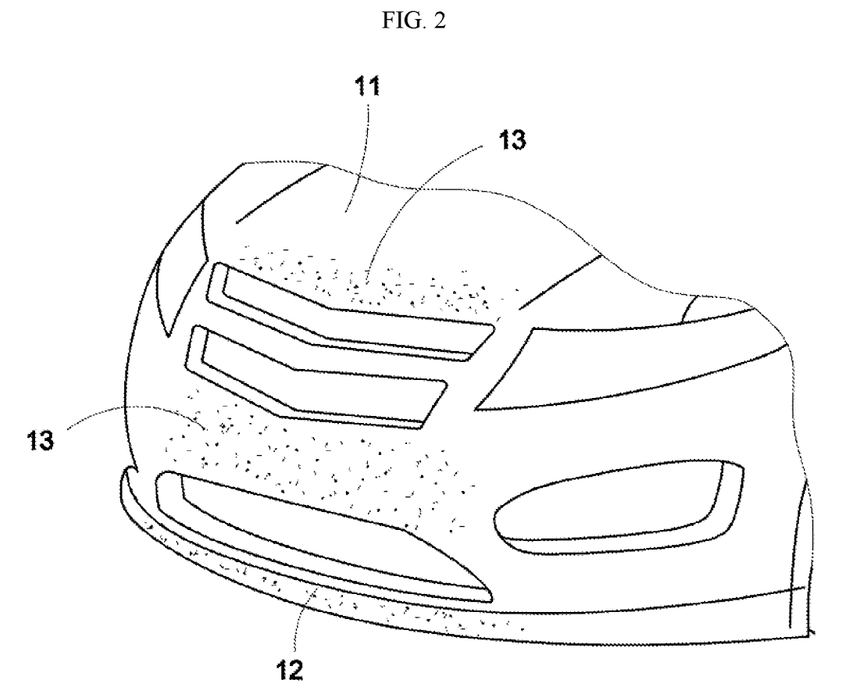
FIG. 2 is a close-up view of the car in accordance with the prior art.

FIG. 1 is a view of a conventional car 10. When new, surfaces of cars 10 are generally substantially scratch and chip free, however, after a little use, scratches and chips are unavoidable. FIG. 2 illustrates a close up view of a hood 11 and a front 12 of the car 10. As shown in FIG. 2, the hood 11 and the front 12 of the car 10 include scratches and chips 13. The scratches and chips 13 detract from the overall appearance of the car 10, and therefore, reduce a value of the car 10.

Generally speaking, repairing scratches and chips 13 on a car 10 may be a rather difficult, expensive, and time consuming process. The process typically begins with a reconditioner (in this application, a person who reconditions a surface) buffing out small scratches and chips. The reconditioner then selects a paint which matches the paint of the automobile and applies the paint with a brush to the remaining scratches and chips. The reconditioner, thereafter, may treat the reconditioned paint with shiner to protect the paint from ultraviolet light to preserve the color of the newly applied paint.

SUMMARY

Example embodiments relate to a product usable for reconditioning a surface. Example embodiments also relate to methods of reconditioning a surface using the product.

Example embodiments are drawn to a product which may include a urethane reducer and an oil. In example embodiments the oil may be extra virgin olive oil. In example embodiments the urethane reducer may be comprised of xylene, methoxy-2-Propyl Acetate, toluene, methyl ethyl ketone, n-butyl acetate, ethyl-3-etholxy propionate, and VM and P Naphtha.

BRIEF DESCRIPTION OF THE DRAWINGS

Example embodiments are described in detail below with reference to the attached drawing figures, wherein.

DETAILED DESCRIPTION

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a product usable for reconditioning a surface. Example embodiments also relate to methods of reconditioning a surface using the product.

Example embodiments relate to a product and methods of treating a surface, some of which use the product. In example embodiments the methods are especially suitable for reconditioning surfaces of a car. The methods, however, are not limited thereto as the methods may be applied to other surfaces such as, but not limited to, surfaces of furniture and signs.

In one nonlimiting example embodiment, the product (hereinafter "Product") may include properties of a reducer and a shining agent. For example, in at least one example embodiment, the Product is created by mixing a urethane reducer with an oil. The urethane reducer, for example, may be comprised of xylene, methoxy-2-Propyl Acetate, toluene, methyl ethyl ketone, n-butyl acetate, ethyl-3-etholxy propionate, and VM & P Naphtha and the oil may be comprised of an olive oil. The urethane reducer, for example, may be comprised of about 1-5% xylene, 5-20% methoxy-2-propyl acetate, 5-20% toluene, 5-20% methyl ethyl ketone, 5-20% n-butyl acetate, 1-5% ethyl-3-ethoxy propionate, and 5-20% VM & P naphtha and the olive oil may be extra virgin olive oil. In one particular embodiment, the Product is produced by mixing about 0.30 gallons of the urethane reducer with about 0.70 gallons of the extra virgin olive oil. In another embodiment the Product may be produced by mixing about 0.35 gallons of urethane reducer with about 0.65 gallons of extra virgin olive oil. In yet another embodiment the Product is produced by mixing about 0.4 gallons of urethane reducer with about 0.6 gallons of extra virgin olive oil. Regardless, in each embodiment, the Product may be capable of removing a urethane paint due to the presence of the urethane reducer while creating a relatively glossy surface due to the presence of the extra virgin olive oil.

The inventor wishes to point out that the invention is not intended to be limited by the aforementioned examples, however, the inventor has discovered that Products containing less than about 60% extra virgin olive oil tend to produce a finish which is not glossy. Similarly, the inventor has discovered that Products containing less than about 30% reducer tend not to be able to remove urethane pain. As such, it is critical, in one embodiment, that the Product have about 60% to about 70% olive oil and about 30% to about 40% urethane reducer.

The inventor also wishes to point out the benefits of using a Product comprising extra virgin olive oil was unexpected. The inventor experimented with several types of oils in conjuction with a product comprising a urethane reducer. Most oils, when mixed with a urethane reducer, did not create a glossy finish when applied to a surface. However, when extra virgin olive oil is mixed with a urethane reducer to produce a product and the product is applied to a urethane based paint, the result is a urethane based paint having a glossy surface. When regular olive oil is combined with a urethane reducer and the resulting product is applied to a urethane based paint, the result is a urethane based paint having a dull surface. Other oils the inventor experimented with, but which did not produce a usable product, includes grape seed oil, vegetable oil, peanut oil, and linseed oil.

Applicant points out that those skilled in the art would readily distinguish extra virgin olive oil from non-extra virgin olive oil. As one skilled in the art would understand, extra virgin olive oil contains no more than 0.8% free acidity (e.g. fatty acid content not greater than about 0.8 g per 100g). As such, in this this application, extra virgin olive oil means olive oil having a fatty acid content of not greater than about 0.8% free acidity.

Figure 3:
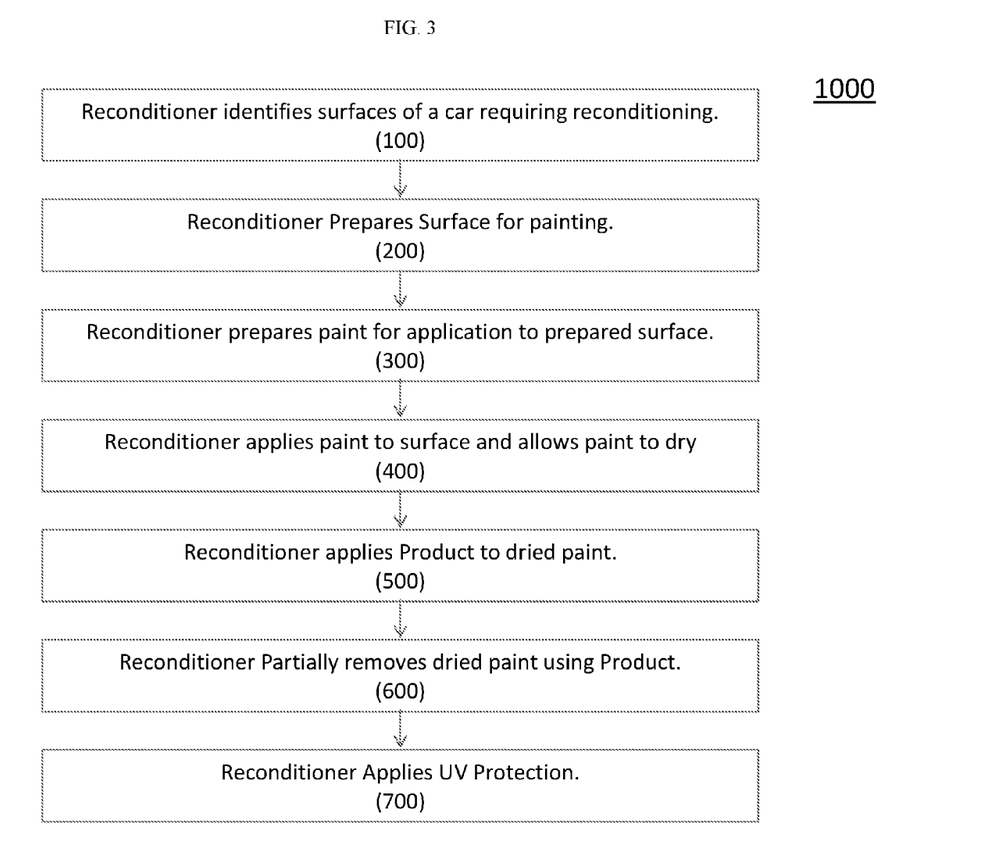
FIG. 3 is a flowchart illustrating a method in accordance with example embodiments.

FIG. 3 is a view of a method 1000 for reconditioning a surface (or surfaces) of a car. The method of FIG. 3 is for purposes of illustration only as is not intended to limit Applicant's inventions as Applicant's invention may be applied in various embodiments and to various surfaces. For example, although FIG. 3 refers to a "reconditioner" as executing all of the steps of method 1000, the steps may be executed by several different persons or may, in the alternative, be automated.

Figure 4A:
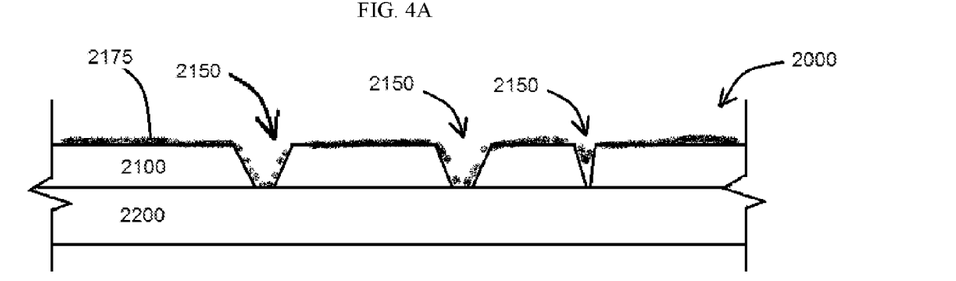
FIG. 4A is a view of a surface having various chips, scratches, and contaminants.

Referring to FIG. 3, the method 1000 begins with a reconditioner identifying surfaces of a car requiring reconditioning 100. Any surface of a car is a candidate for reconditioning. For example, a hood of a car, car doors, and even a roof of a car may be a candidate for reconditioning. FIG. 4A illustrates an example of a surface 2000 requiring reconditioning. As shown in FIG. 4A, the surface 2000 includes a paint 2100 on a base material 2200. The paint 2100, as shown in FIG. 4A, includes several chips and scratches 2150 that expose the base material 2200. FIG. 4A also illustrates contaminants 2175 that may be in the chipped region of the paint 2100 or on the paint 2100. The contaminants 2175, for example, may be, but are not required, particles of dust, dirt, and/or oil. In example embodiments the base material 2200 may be, but is not required to be, metal associated with a car, for example, a hood of a car.

Figure 4B:
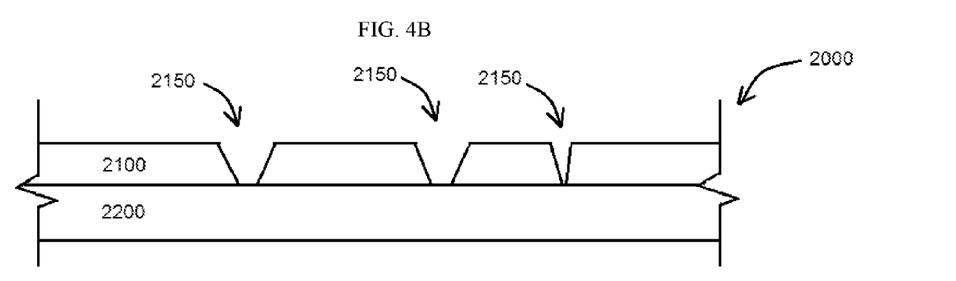
FIG. 4B illustrates the surface after being prepared by a reconditioner.

As indicated above, any surface of a car may be a candidate for reconditioning. In areas requiring reconditioning the reconditioner prepares the surface to be reconditioned 200. Preparing the surface may include a step of applying wax and/or grease remover to clean the surface to be reconditioned. In the alternative (or in addition to the above procedure), the reconditioner may use a conventional cleaner such as water based cleaner to clean and prepare the surface to be reconditioned. In example embodiments, when a surface is prepared the various contaminants are largely, if not entirely, removed from the surface 2000. Properly preparing surfaces may be relatively important since improperly prepared surfaces may attribute to a coating failure. Preparing surfaces for reconditioning is relatively common in the art, as such, a description thereof is omitted for the sake of brevity. FIG. 4B illustrates the surface 2000 cleaned and the contaminants 2175 removed.

After the surface for reconditioning is identified and the surface for reconditioning is properly prepared (that is, cleaned), the reconditioner may select a color of paint to apply to the prepared surface 300. For example, if the surface to be reconditioned is white the reconditioner may select a white urethane based paint for application to the surface. On the otherhand, if the color of the surface is pink, the reconditioner may mix white and red paint until the color of the mixed paint matches that of the prepared surface. After selecting the proper color of paint the reconditioner may apply the paint to the prepared surface and allow the paint to dry 400. Drying time may be relatively short, for example, 60-90 seconds, however, the drying time may be longer or shorter depending on the amount or type of paint applied.

Figure 4C:
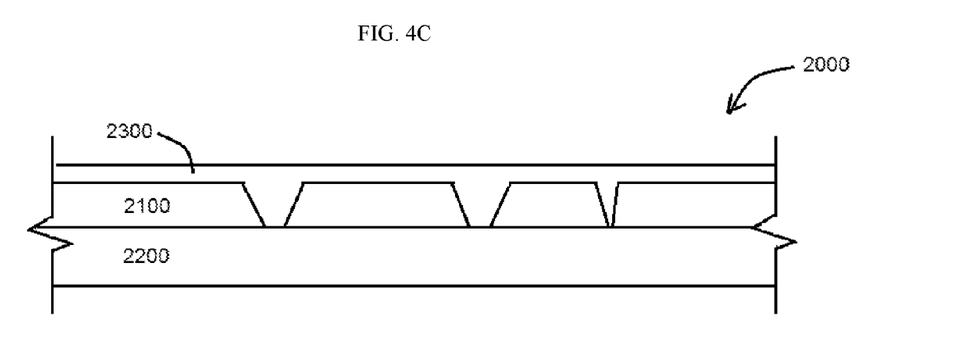
FIG. 4C illustrates a layer of paint applied to the prepared surface.

In example embodiments the paint may be applied in various manners. For example, in one embodiment, the reconditioner may use a rubber glove to apply the paint. In another embodiment, the reconditioner may apply the paint using a brush or a squeegee type material. In yet another embodiment, paint may be applied using a cloth type material. Regardless of the manner in which the paint is applied, the paint is generally over applied on the various scratches and chips to ensure the chips or scratches are properly filled with paint. FIG. 4C illustrates paint 2300 applied by the reconditioner. As shown in FIG. 4C, there is an excess of paint 2300 covering and filling in the chips and scratches 2150 as well as the paint 2100.

Though not specifically shown in the figures, the reconditioner may also mix the paint with other agents prior to applying the paint to the surface. For example, in one embodiment, the paint may be mixed with a paint lock and shiner. Such a mixture may be applied to the surface and allowed to dry. In this application a paint lock is a hardener for urethane based paint. An example of a paint lock is pih35 manufactured by Martin Senior. In this application a shiner is an agent that may be mixed with a urethane paint and may be used to make the paint relatively shiney. An example of a shiner is pcc280 manufatured by Martin Senior.

Figure 4D:
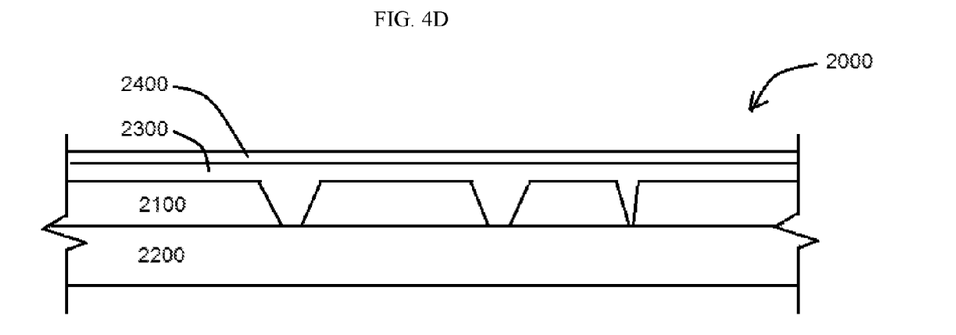
FIG. 4D illustrates the surface having a product applied to the newly applied paint.

After the paint is dried the reconditioner may apply the Product 500 to the dried paint and use the Product to remove any excess paint. As indicated above, the paint may have been overly applied. Applying the Product allows the reconditioner to remove the excess paint since the Product generally includes a urethane reducer which dissolves a portion of the newly applied paint. In example embodiments because the Product generally includes an oil, the paint which is not removed by the Product has a relatively glossy appearance. This stands in stark contrast to conventional reconditioning methods which do not include a Product similar to the inventor's Product. FIG. 4D illustrates the Product 2400 applied on the paint 2300.

Figure 4E:
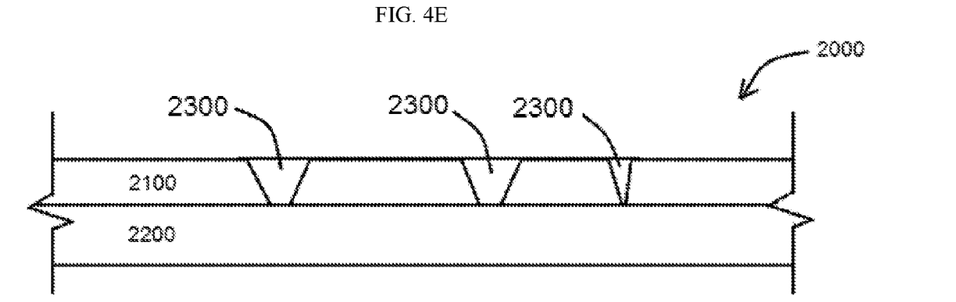
FIG. 4E illustrates the surface having some of the newly applied paint removed.

In example embodiments, the Product may be applied in various ways. For example, in one embodiment, the Product is provided in a spray bottle and sprayed onto the surface to be reconditioned. After being sprayed on the surface to be reconditioned the reconditioner may use a cloth or a paper towel to remove the Product as well as a portion of the newly applied paint. The reconditioner, for example, may apply pressure to the cloth which may be pressed onto the Product. The reconditioner may use, for example, circular motions to rub the Product into the newly applied paint to remove some of the newly applied paint which may be wiped away by the cloth 600. For example, a reconditioner may use a cloth or a paper towel, for example, Scott's blue paper towel, to remove the product and excess paint. FIG. 4E, for example, illustrates the surface 2000 with the extra paint removed by application of the Product to the excess paint. As shown in FIG. 4E paint 2300 fills in the chips and scratches 2150. Once the extra paint has been removed the reconditioner may apply a material which provides UV protection to the remaining paint 700.

Figure 4F:
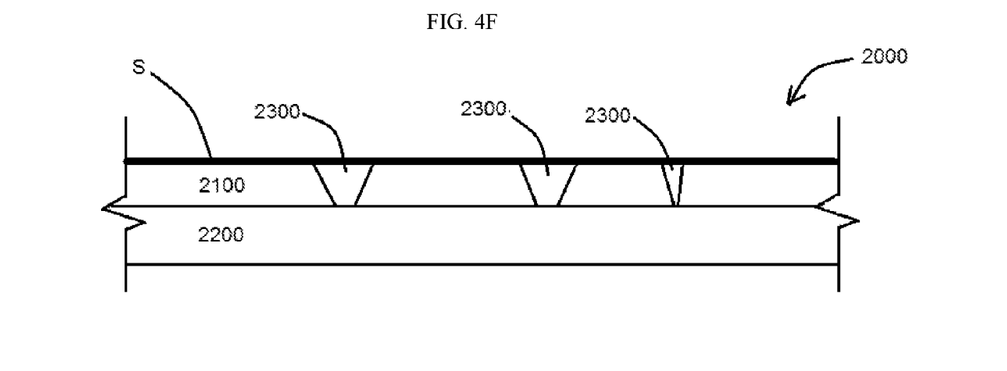
FIG. 4F illustrates the surface having a glossy surface due to application of a Product in accordance with example embodiments.

FIG. 4F illustrates a surface after the reconditioning process illustrated in FIG. 3. As shown in FIG. 4F, all surfaces subjected to the method of FIG. 3 result in a surface having a glossy finish. For example in FIG. 4F the surface S has a relatively shiney and glossy surface in part due to the extra virgin olive oil present in the Product.

In addition to treating scratched surfaces, the inventor has discovered that the Product is also usable for treating other parts of an automobile such as moldings and bumper trims. Application of the Product to these surfaces results in surfaces having a substantially clean appearance.

Figure 5:
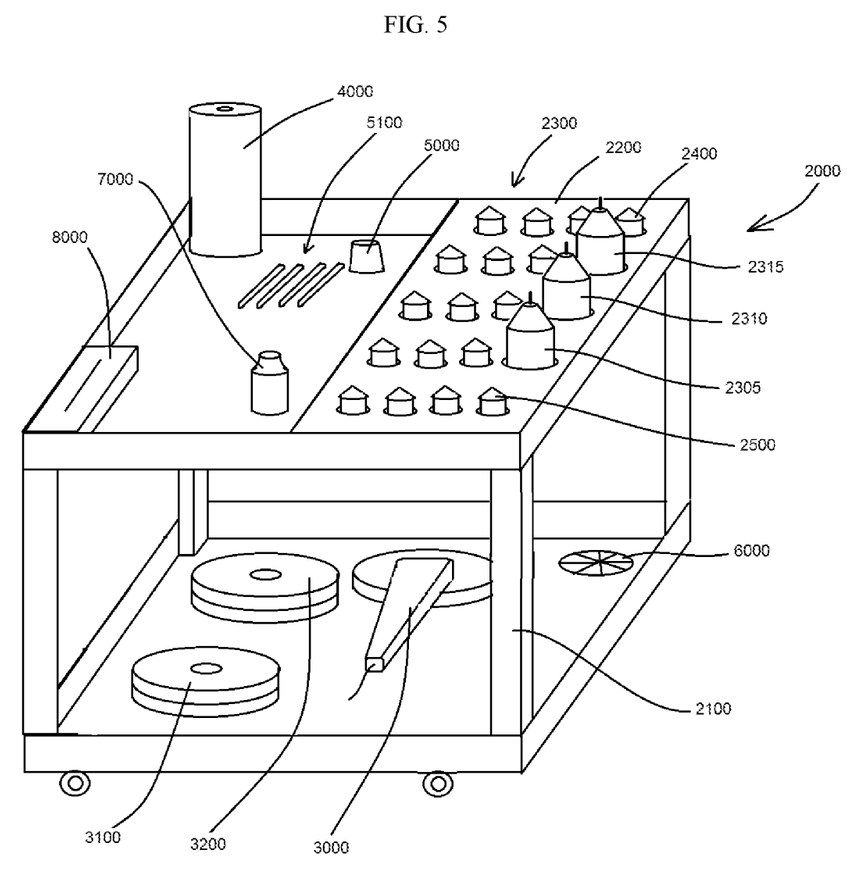
FIG. 5 is a view of a kit in accordance with example embodiments.

In order to expedite the method of FIG. 3, the inventor developed a kit 2000 which may be used by industry professionals to recondition surfaces. FIG. 5, for example, illustrates a view of an example kit 2000. As shown in FIG. 5, the kit 2000 may be, but is not required to be, mounted on a cart 2100. The cart 2100 may impart mobility to the kit 2000. The kit 2000 may include a top plate 2200 with holes therein to hold a plurality of containers of paint 2300. For example, a first container 2305 of the plurality of containers 2300 may contain a white paint, a second container 2310 of the plurality of containers 2300 may contain a black paint, and a third container 2315 of the plurality of containers 2300 may contain a silver paint. The other containers of the plurality of containers 2300 may contain other paint colors, for example, red, blue, brown, green, etc.. In example embodiments each of the containers of the plurality of containers 2300 may hold about eight (8) ounces of paint. The quantity of paint held by the containers 2300, however, is merely for purposes of illustration only as each of the containers 2300 may include more or less than eight (8) ounces of paint. For example, each of the first, second and third containers 2305, 2310, and 2315 may hold more than eight (8) ounces of paint whereas the rest of the containers 2300 hold only eight (8) ounces of paint. The kit 2000 may include additional items such as, but not limited to, bottles of paint lock 2400 and shine agents 2500 which may be used in the reconditioning process. The kit 2000 may also include a buffer 3000 (for example, a DeWalt Buffer), buffing pads 3100, polishing pads 3200, buffing compounds (not shown), and polishing compounds (not shown) which may be used to repair minor scratches or chips. The kit 2000 may also include micro fiber towels, paper towels (example, Scott's blue towels) 4000, cups for mixing paint 5000, paint stirrers 5100, and a laminated color wheel 6000 to aid a reconditioner in selecting or making a correct color of paint for the reconditioning process. The kit 2000 may further include a bottle 7000 holding the Product. In the alternative, the kit 2000 may house a bottle of urethane reducer and a bottle of extra virgin olive oil which may be mixed by the reconditioner to form the Product. The kit 2000 may include additional items, for example, rubber gloves 8000 to aid in applying paint to a prepped surface.

Figure 6:
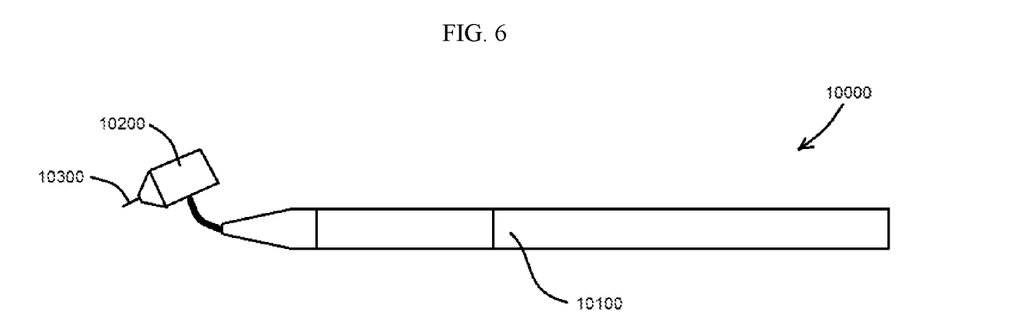
FIG. 6 is a view of a pen in accordance with example embodiments.

FIG. 6 is a view of a paint applicator pen 10000 which may be used to recondition a surface. As shown in FIG. 6, the pin 10000 may have a body 10100 which resembles a pen. At an end of the body 10100 is a well 10200 which may hold paint, for example, a urethane based paint. The well 10200 may be in fluid communication with a brush 10300 through which paint may be applied to a surface. An example of the applicator pen 10000 is the Kemper Fluid Writer Pen. The applicator pen 10000 may be used to apply paint to surfaces where small chips or scratches are present. In this method of reconditioning the surface, a reconditioner may add paint to the paint applicator pen 10000 and move the pin 10000 so the brush 10300 is near the chip. Paint may then flow from the well 10200 to the brush 10300 which may then be applied to fill the chip.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

I claim:

1. A product comprised of:
   a urethane reducer; and
   extra virgin olive oil, wherein at least 60 percent of the is comprised of the extra virgin olive oil and at least 30 percent of the product is comprised of the urethane reducer.

2. The product of claim 1, wherein the urethane reducer is comprised of xylene, methoxy-2-Propyl Acetate, toluene, methyl ethyl ketone, n-butyl acetate, ethyl-3-etholxy propionate, and VM and P Naphtha.

3. The product of claim 1, wherein urethane reducer is comprised of about 1-5% xylene, 5-20% methoxy-2-propyl acetate, 5-20% toluene, 5-20% methyl ethyl ketone, 5-20% n-butyl acetate, 1-5% ethyl-3-ethoxy propionate, and 5-20% VM and P naphtha.

4. A cart comprising:
a container having the product of claim 1.

5. A method comprising:
applying the product of claim 1 to a surface at least partially covered by a first urethane paint;
removing the product and at least a portion of the first urethane paint by pressing the product of claim 1 onto the first urethane paint and using a towel to remove the product and the portion of the first urethane paint.

6. The method of claim 5, further comprising:
applying the first urethane paint to a surface coated with a second urethane paint, wherein the second urethane paint has at least one scratch or chip.

7. The method of claim 6, when the first urethane paint is applied to the surface the first urethane paint at least partially fills the at least one scratch or chip.

8. The method of claim 7, further comprising:
removing contaminants from the surface before applying the first urethane paint to the surface.

9. The method of claim 8, further comprising:
applying a UV protection layer to the first urethane paint after the Product is removed.

* * * * *

UNITED STATES PATENT AND TRADEMARK OFFICE
CERTIFICATE OF CORRECTION

| | | |
|---|---|---|
| PATENT NO. | : 10,023,753 B1 | Page 1 of 1 |
| APPLICATION NO. | : 15/004747 | |
| DATED | : July 17, 2018 | |
| INVENTOR(S) | : Jamie Lasher | |

It is certified that error appears in the above-identified patent and that said Letters Patent is hereby corrected as shown below:

In the Claims

In Column 6, beginning at Line 62, Claim 1 should read as follows:
1. A product comprised of:
a urethane reducer; and
extra virgin olive oil, wherein at least 60 percent of the product is comprised of the extra virgin olive oil and at least 30 percent of the product is comprised of the urethane reducer.

Signed and Sealed this
Twenty-eighth Day of August, 2018

Andrei Iancu
*Director of the United States Patent and Trademark Office*